(12) United States Patent
Liu et al.

(10) Patent No.: US 12,104,027 B2
(45) Date of Patent: *Oct. 1, 2024

(54) NON-POROUS, BREATHABLE AND WATERPROOF TRANSPARENT PLASTIC FILM AND METHOD FOR MANUFACTURING THE SAME

(71) Applicant: Nano and Advanced Materials Institute Limited, Hong Kong (HK)

(72) Inventors: Xianqiao Liu, Hong Kong (HK); Fengyu Yang, Hong Kong (HK); Yik Wong Ng, Hong Kong (HK); Yueying Chen, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 192 days.

This patent is subject to a terminal disclaimer.

(21) Appl. No.: 17/888,501

(22) Filed: Aug. 16, 2022

(65) Prior Publication Data

US 2024/0076460 A1   Mar. 7, 2024

(51) Int. Cl.
*C08J 5/18* (2006.01)
*B29C 48/00* (2019.01)
(Continued)

(52) U.S. Cl.
CPC ............... *C08J 5/18* (2013.01); *B29C 48/022* (2019.02); *B29C 48/08* (2019.02); *C08F 210/02* (2013.01);
(Continued)

(58) Field of Classification Search
CPC ... B29C 48/022; B29C 48/08; B29K 2023/08; B29K 2025/08; B29K 2067/003;
(Continued)

(56) References Cited

U.S. PATENT DOCUMENTS

| 6,953,510 B1 | 10/2005 | Mackay et al. |
| 8,029,892 B2 | 10/2011 | Lacroix |
| 2002/0098341 A1 | 7/2002 | Schiffer et al. |

FOREIGN PATENT DOCUMENTS

| CN | 103642181 A | 3/2014 |
| CN | 104292693 A | 1/2015 |

(Continued)

*Primary Examiner* — Lawrence D Ferguson
(74) *Attorney, Agent, or Firm* — Idea Intellectual Limited; Margaret A. Burke; Sam T. Yip (57) ABSTRACT

The present invention provides a non-porous, breathable and waterproof transparent plastic film on a plastic substrate and methods for fabricating the same. The film includes a thermoplastic polyester resin, an amphiphilic modifier having a hydrophilic segment that acts as a channel for water vapor transmission through the film connected to a hydrophobic segment that anchors the amphiphilic modifier to a portion of the polyurethane base resin and a compatibilizer. The resultant non-porous, breathable and waterproof transparent plastic film has a water vapor transmission rate (WVTR) or breathability of not less than 250 g/m²/24 hr according to ASTM E96B, and having at least 90% of the transmittance. They are also resistant to liquid penetration and micro-contaminants such as bacteria and virus, making them suitable for broad applications in medical, healthcare and food packaging industries.

18 Claims, 4 Drawing Sheets

(51) Int. Cl.
  *B29C 48/08* (2019.01)
  *C08F 210/02* (2006.01)
  *C08F 220/14* (2006.01)
  *C08G 63/183* (2006.01)
  *C08G 65/08* (2006.01)
  *C08G 81/00* (2006.01)
  *B29K 23/00* (2006.01)
  *B29K 25/00* (2006.01)
  *B29K 67/00* (2006.01)
  *B29K 71/00* (2006.01)
  *B29L 9/00* (2006.01)
  *B29L 31/00* (2006.01)

(52) U.S. Cl.
  CPC .......... *C08F 220/14* (2013.01); *C08G 63/183* (2013.01); *C08G 65/08* (2013.01); *C08G 81/00* (2013.01); *B29K 2023/08* (2013.01); *B29K 2025/08* (2013.01); *B29K 2067/003* (2013.01); *B29K 2071/02* (2013.01); *B29K 2995/0026* (2013.01); *B29K 2995/0065* (2013.01); *B29K 2995/0093* (2013.01); *B29K 2995/0097* (2013.01); *B29L 2009/00* (2013.01); *B29L 2031/712* (2013.01)

(58) Field of Classification Search
  CPC ........ B29K 2071/02; B29K 2995/0026; B29K 2995/0065; B29K 2995/0093; B29K 2995/0097; B29L 2009/00; B29L 2031/712; C08F 210/02; C08F 220/14; C08G 63/183; C08G 65/08; C08G 81/00; C08J 5/18; H01L 2224/1134
  See application file for complete search history.

(56) References Cited

FOREIGN PATENT DOCUMENTS

| | | |
|---|---|---|
| CN | 104441868 A | 3/2015 |
| CN | 103571012 B | 5/2016 |

FIG. 1

| | Sample (1cmx1cm) | Position 1 (200 um x 200 um) | Position 2 (200 um x 200 um) | Position 3 (200 um x 200 um) | Position 4 (200 um x 200 um) | Position 5 (200 um x 200 um) | Position 6 (200 um x 200 um) |
|---|---|---|---|---|---|---|---|
| Control PET40 | | | | | | | |
| NBF-PET40 #1 | | | | | | | |
| NBF-PET40 #2 | | | | | | | |
| NBF-PET40 #3 | | | | | | | |
| NBF-PET40 #4 | | | | | | | |

| | Sample (1cm×1cm) | Position 1 (200 um × 200 um) | Position 2 (200 um × 200 um) | Position 3 (200 um × 200 um) | Position 4 (200 um × 200 um) | Position 5 (200 um × 200 um) | Position 6 (200 um × 200 um) |
|---|---|---|---|---|---|---|---|
| Control PET100 |  |  |  |  |  |  |  |
| NBF-PET100 #1 |  |  |  |  |  |  |  |
| NBF-PET100 #2 |  |  |  |  |  |  |  |
| NBF-PET100 #3 |  |  |  |  |  |  |  |
| NBF-PET100 #4 |  |  |  |  |  |  |  |
| NBF-PET100 #5 |  |  |  |  |  |  |  |

FIG.4

NON-POROUS, BREATHABLE AND WATERPROOF TRANSPARENT PLASTIC FILM AND METHOD FOR MANUFACTURING THE SAME

FIELD OF THE INVENTION

The invention relates to the technical field of plastic products. More specifically, the present invention relates to a non-porous, breathable and waterproof transparent plastic film and methods for preparing the same.

BACKGROUND OF THE INVENTION

In recent years, the global demand for plastic films has continued to rise, especially the continuous shift in packaging formats from rigid packaging to flexible packaging, which is also a major factor driving the growth in demand for film materials.

Most plastic films on the market are porous, and are hydrophobic and not breathable by water vapor. For instance, a micro-porous film can be defined as a thin-walled structure having an open spongy morphology of precisely controlled pore size, typically ranging from 0.03 μm to 10 μm in diameter. However, the current micro-porous plastic films have the limitations of instable breathability, low comfort, translucent or opaque in appearance and poor mechanical strength. Further, the micro-pores of the films allow pathogenic bacteria, virus and mold to penetrate, thereby enhancing the risk of contamination.

Non-porous films made with special tri-block polymers have also been developed. Although these films may block the penetration of microorganisms, their applications are very limited due to fixed breathability at a thin thickness (e.g., 15 μm), translucent appearance, poor mechanical strength, and high cost. Thus, there is a need in the art to develop novel non-porous films with improved properties. The present invention addresses this need.

SUMMARY OF THE INVENTION

In accordance with one aspect of the present invention, there is provided a non-porous, breathable and waterproof transparent plastic film on a plastic substrate. The film includes a thermoplastic polyester resin, an amphiphilic modifier having a hydrophilic segment that acts as a channel for water vapor transmission through the film connected to a hydrophobic segment that anchors the amphiphilic modifier to a portion of the thermoplastic base resin, and a compatibilizer. The film has a water vapor transmission rate (WVTR) or breathability of not less than 250 g/m$^2$/24 hr according to ASTM E96B, and having at least 90% of the transmittance.

In a first embodiment of the first aspect of the present invention, the thermoplastic polyester resin includes PET, PBT, PTT, PC, or PLA.

In a second embodiment of the first aspect of the present invention, the content of the thermoplastic polyester resin ranges from 50 to 80 weight percent, the content of the amphiphilic modifier ranges from 20 to 40 weight percent, and the content of the compatibilizer ranges from 5 to 10 weight percent.

In a third embodiment of the first aspect of the present invention, the amphiphilic modifier includes at least one hydrophobic hard segment with the repeating unit of 1 to 1000 and at least one hydrophilic soft segment with the repeating unit of 1 to 1000.

In a fourth embodiment of the first aspect of the present invention, the at least one hydrophilic soft segment includes polyether, and the at least one hydrophobic hard segment includes polyester.

In a fifth embodiment of the first aspect of the present invention, the polyether includes polyethylene glycol (PEG), polypropylene glycol (PPG), polyethylene oxide (PEO), or a combination thereof.

In a sixth embodiment of the first aspect of the present invention, the compatibilizer includes a random copolymer of ethylene and methyl acrylate.

In a seventh embodiment of the first aspect of the present invention, the film further includes a chain extender incorporated between the base polymer and the amphiphilic modifier to form a coupling bridge. The chain extender includes at least one polyol.

In an eighth embodiment of the first aspect of the present invention, the thickness of the non-porous, breathable and waterproof transparent plastic film is in a range of 1 to 40 μm or more than 0.1 mm.

In accordance with another aspect of the present invention, there is provided a method for preparing a non-porous, breathable and waterproof transparent plastic film. First, a thermoplastic polyester resin is mixed with an amphiphilic modifier and a compatibilizer via an extruder to obtain a polymer mixture. The polymer is divided into small pellets via a pelletizer. The small pellets are extruded via a single-screw film extruder to obtain a film under a reaction temperature in a range of 240 to 270° C. with a screw speed of 150 rpm. The film is hot pressed via a flat vulcanizing machine to form the non-porous, breathable and waterproof transparent plastic film under a reaction temperature in a range of 250 to 300° C. with a pressure of 7 MPa.

In a first embodiment of the second aspect of the present invention, the thermoplastic polyester resin includes PET, PBT, PTT, PC, or PLA.

In a second embodiment of the second aspect of the present invention, the content of the thermoplastic polyester resin ranges from 50 to 80 weight percent, the content of the amphiphilic modifier ranges from 20 to 40 weight percent, and the content of the compatibilizer ranges from 5 to 10 weight percent.

In a third embodiment of the second aspect of the present invention, the amphiphilic modifier includes at least one hydrophobic hard segment with the repeating unit of 1 to 1000 and at least one hydrophilic soft segment with the repeating unit of 1 to 1000. The at least one hydrophilic soft segment includes polyether, and the at least one hydrophobic hard segment includes polyester. The polyether includes polyethylene glycol (PEG), polypropylene glycol (PPG), polyethylene oxide (PEO), or a combination thereof.

In a fourth embodiment of the first aspect of the present invention, the compatibilizer includes a random copolymer of ethylene and methyl acrylate.

In a fifth embodiment of the second aspect of the present invention, the polymer mixture includes a chain extender that includes at least one polyol.

In a sixth embodiment of the second aspect of the present invention, the thickness of the non-porous, breathable and waterproof transparent plastic film is in a range of 1 to 40 μm or more than 0.1 mm.

The present invention relates to non-porous, breathable and waterproof transparent plastic films of different thicknesses using 3-step processes, including twin screw extrusion (TSE), single screw extrusion (SSE), and flat vulcanizing. The resultant films are tunable with respect to breathability and exhibit stable breathability, high transparency, and low cost.

BRIEF DESCRIPTION OF THE DRAWINGS

Embodiments of the invention are described in more details hereinafter with reference to the drawings, in which.

DETAILED DESCRIPTION OF THE INVENTION

Definitions

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. patent law; e.g., they allow for elements not explicitly recited, but exclude elements that are found in the prior art or that affect a basic or novel characteristic of the present invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, the term "breathable" means that the film is pervious to water vapor and gases. In other words, "breathable films" allow water vapor and gases to pass there through, but not necessarily liquids.

As used herein, the term "non-porous" means that no pores are provided on the films, which make the films are resistant to penetration of hazardous substances or non-permeable substance or materials.

As used herein, the term "thin film" refers to the films with a thickness between 1 to 40 μm. For example, the films have a thickness of 1 μm, 5 μm, 10 μm, 15 μm, 20 μm, 25 μm, 30 μm, 35 μm, or 40 μm.

As used herein, the term "thick film" refers to the films with a thickness more than 0.1 mm. For example, the films have a thickness of 0.1 mm, 0.3 mm, 0.5 mm, 0.8 mm, 1 mm, 5 mm, 10 mm, 15 mm, 20 mm, 25 mm, 30 mm, 40 mm, or 50 mm.

Other definitions for selected terms used herein may be found within the detailed description of the present invention and apply throughout. Unless otherwise defined, all other technical terms used herein have the same meaning as commonly understood to one of ordinary skill in the art to which the present invention belongs.

In order to address the objectives and needs discussed above, the present invention provides a non-porous, breathable and waterproof transparent plastic film on a plastic substrate. The film includes a thermoplastic polyester base resin, an amphiphilic modifier, a compatibilizer and an optional chain extender incorporated between the base polymer and the amphiphilic modifier to form a coupling bridge.

The base polymer and the amphiphilic modifier identified herein should meet the following requirements:

1) skin contact safe;

2) food contact safe;

3) within reasonable cost target.

In addition to skin and food contact safety, the modifier should also be capable to 1) enhance the breathability of the modified film to achieve no less than 250 $g/m^2/24$ hr within specific thickness range; 2) maintain no less than 90% light transmittance as compared to unmodified control film.

The modifiers used herein are amphiphilic structure, which consists of the soft segment of a hydrophilic chain and the hard segment of hydrophobic chain as anchor. More specifically, an aliphatic modifier includes coupling of a hydrophilic functional group such as hydroxyl group (—OH), carboxyl groups (—COOH), and a hydrophobic backbone. The hard segment acts as an anchor to the thermoplastic polyester base resin, and the soft segment acts as a channel for water vapor transmission and provides breathability properties.

In one embodiment, the hydrophilic soft segment is polyether, such as PEG, PPG and PEO. The hydrophobic hard segment is polyester with compatibility with the thermoplastic polyester base resin, serving as an anchor. Based on these criteria, two modifiers and one compatibilizer for PET were selected as set forth in Table 1.

TABLE 1

Modifiers and compatibilizer screened for non-porous PET film development

| Modifier for PET | Chemical structure |
|---|---|
| Arnitel VT3108 | $\left[\left(-C(=O)-C_6H_4-C(=O)-O-(CH_2)_4-O-\right)_x\left(-C(=O)-C_6H_4-C(=O)-O-(CH_2)_4-O-\right)_n\right]_y$ |
| Pebax MH1675 | $HO-\left[\left(-C(=O)-(CH_2)_5-C(=O)-NH-\right)_x -C(=O)-O-(CH_2-CH_2-O)_y\right]_n -H$ (PA and PEO blocks) |

| Compatibilizer for PET | Chemical structure |
|---|---|
| Lotryl 24MA02 | Poly(ethylene-co-ethyl acrylate): $[-CH_2-CH_2-]_x[-CH_2-CH(C(=O)OCH_2CH_3)-]_y$ |

In one embodiment of the present invention, an optional chain extender is included to enhance a coupling reaction between the amphiphilic modifier and the thermoplastic base resin. In one embodiment, the chain extender may include at least one polyol with multiple —OH groups. Polyols are monosaccharide and disaccharide molecules in which the aldehyde group is replaced by a hydroxyl, such as glucitol, xylitol, maltitol, etc.

In one embodiment of the present invention, the prepared films can be divided into two types, one is thin film with a thickness between 1 to 40 μm, and another one is thick film with a thickness more than 0.1 mm.

In one embodiment of the present invention, both thin films and thick films have a water vapor transmission rate (WVTR) or breathability of not less than 250 g/m²/24 hr according to ASTM E96B, preferably higher than 800 g/m²/24 hr.

In one embodiment of the present invention, the films are colorless and/or transparent, allowing effective penetration of ultraviolet and visible light. In particular, the target light transmittance is no less than 90% as compared to the unmodified control films. For instance, at least 90%, at least 91%, at least 92%, at least 93%, at least 94%, at least 95%, at least 96%, at least 97%, at least 98%, or at least 99%, or 100%.

In accordance with a second aspect of the present invention, there is provided a method for preparing a non-porous, breathable and waterproof transparent plastic film on a plastic substrate, including mixing a thermoplastic polyester base resin with an amphiphilic modifier and a compatibilizer via an extruder to obtain a polymer mixture, wherein a reaction temperature is at 200 to 290° C.; dividing the polymer mixture into small pellets via a pelletizer; extruding the small pellets via a single-screw film extruder (e.g., HAPRO, RM-200C Extrusion Torque Rheometer) to obtain a film, wherein a reaction temperature is at 240 to 270° C. with a screw speed of 150 rpm; and hot pressing the film via a flat vulcanizing machine (ZS-406B-30-300) to form the non-porous, breathable and waterproof transparent plastic film, wherein a reaction temperature is at 250 to 300° C. with a pressure of 7 MPa.

The purpose for the mixing was to ensure a better distribution and dispersion of the modifier within the thermoplastic polyester base resin.

The description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated.

One skilled in the art would readily appreciate that different functions discussed herein may be performed in a different order and/or concurrently with each other. Many modifications and variations will be apparent to the practitioner skilled in the art. Furthermore, if desired, one or more of the embodiments described herein may be optional or may be combined. Other aspects and advantages of the present invention will be apparent to those skilled in the art from a review of the present application.

EXAMPLE

Example 1

Fabrication of Thin PET Based Non-Porous Film

PET CR8816 was chosen to be the base resin of PET, as it is transparent, mechanically strong, skin and food contact safe. Arnitel VT3108 or Pebax MH1675 were chosen for modifying PET. Since these two modifiers have excellent water vapor transportation properties, they were expected to improve the breathability of the films significantly. In addition, a compatibilizer was added.

Four thin PET based non-porous films were prepared by mixing the PET base resin and modifier, followed by film extrusion and hot press process. In particular, the mixing of PET resin and modifier was achieved by using a co-rotating twin-screw extruder (HAKKE, PTW16/25 OS), and the temperature was at 200 to 290° C. The screw speed was set at 300 rpm.

Figure 1:
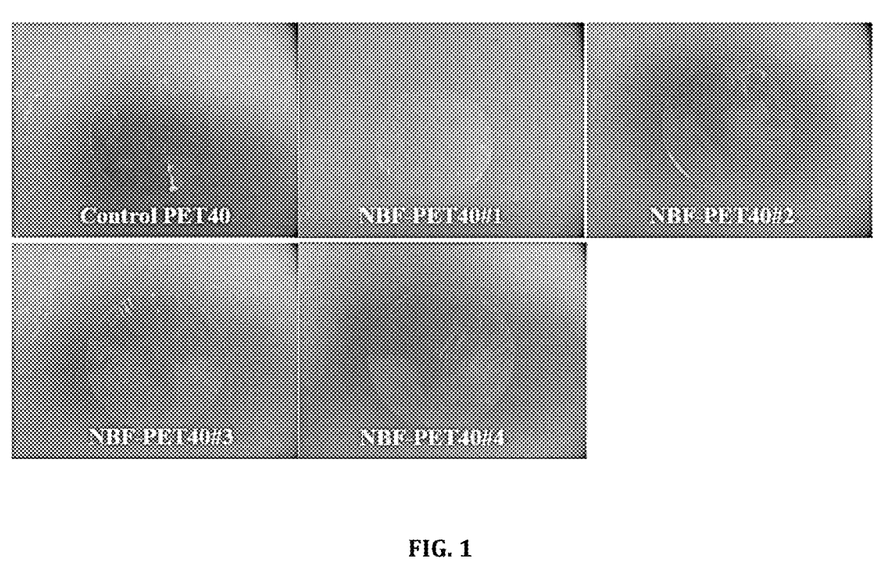
FIG. 1 depicts appearance of the prepared thin PET based films with thickness less than 40 μm in accordance to one embodiment of the present invention.

Different film forming compositions in accordance with the present invention are shown in Table 2. The as-prepared thin PET based non-porous films were shown in FIG. 1. All formulations can form films with thicknesses less than 40 μm.

TABLE 2

Formulations of thin PET based non-porous films.

| | PET base resin (CR8816) | Modifier (VT3108) | Modifier (MH1657) | Compatibilizer (20MA02) |
|---|---|---|---|---|
| NBF-PET40 #1 | 80% | 20% | — | — |
| NBF-PET40 #2 | 70% | 30% | — | — |
| NBF-PET40 #3 | 60% | 40% | — | — |
| NBF-PET40 #4* | 50% | — | 40% | 10% |

*screened one formula with high breathability achieved, to be optimized in next step Example 2

Analysis of Appearance of the Thin Film

To ensure the as-prepared thin films are non-porous, SEM imaging were conducted.

Figure 2:
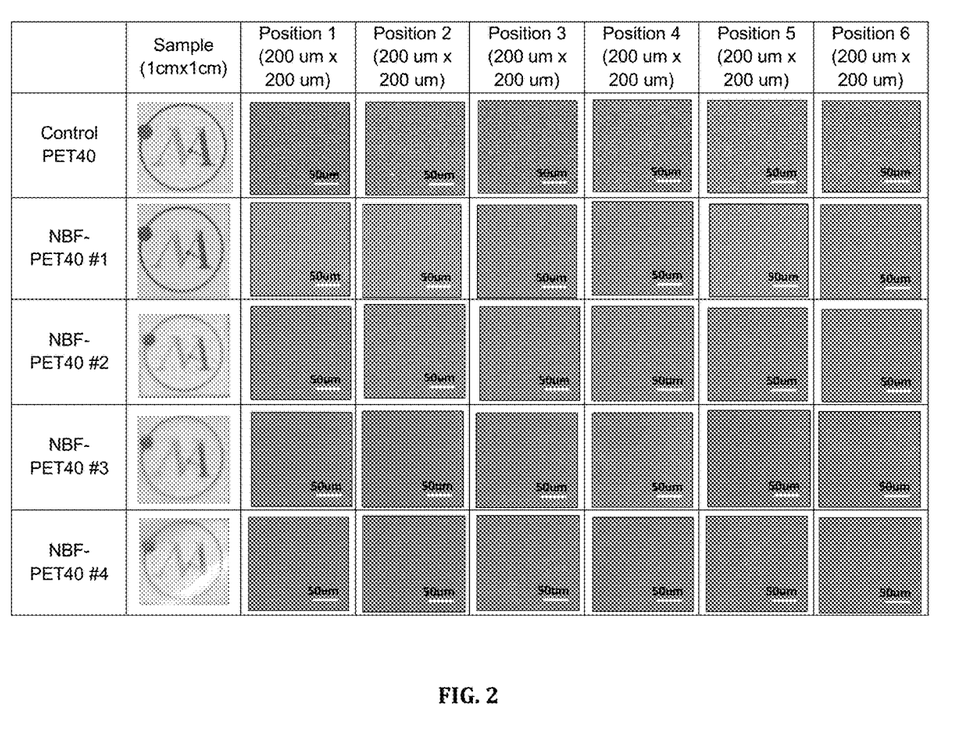
FIG. 2 shows scanning electron microscope (SEM) images of non-porous PET based films with a thickness less than 40 μm in accordance to one embodiment of the present invention.

Six different areas of the films (200 μm×200 μm for each) were selected and no obvious pore was founded. The SEM images of non-porous PET based films with a thickness less than 40 μm were shown in FIG. 2. From the SEM images, it could be seen that no pore with diameter larger than 1 μm was observed.

Example 3

Transmittance of the Thin Film

The light transmittance of the prepared thin films was measured in comparison with the unmodified control films (e.g., PET) according to industrial standard test methods (e.g., ASTM E 96 B).

The light transmittance of the as-prepared thin PET based films has been tested and compared with the control films to ensure the light transmittance of the films can retain no less than 90% of the control films. The results of non-porous PET based films were shown in Table 3.

TABLE 3

Light transmittance of non-porous PET based films with a thickness less than 40 μm

| | PET base resin (CR8816) | Modifier (VT3108) | Modifier (MH1657) | Compatibilizer (24MA02) | Thickness (μm) | Light transmittance (%) | Light trans. retention (%) |
|---|---|---|---|---|---|---|---|
| Control PET40 | 100% | — | — | — | 38 ± 1 (n = 3) | 90.90 ± 0.28 (n = 3) | — |
| NBF-PET40#1 | 80% | 20% | — | — | 34 ± 4 (n = 3) | 89.88 ± 0.19 (n = 3) | 98.88 |
| NBF-PET40#2 | 70% | 30% | — | — | 37 ± 3 (n = 3) | 89.69 ± 0.40 (n = 3) | 98.67 |
| NBF-PET40#3 | 60% | 40% | — | — | 38 ± 1 (n = 3) | 90.20 ± 0.05 (n = 3) | 99.23 |
| NBF-PET40#4 | 50% | — | 40% | 10% | 39 ± 1 (n = 3) | 84.12 ± 1.43 (n = 3) | 92.54 |

From Table 3, it was found that the light transmittance retention for thin non-porous PET based films was more than 90% when comparing to the corresponding control films, indicating that the addition of the modifiers would not have big impact to the light transmittance of the films.

Example 4

Breathability of the Thin Film

Apart from the retention of light transmittance, the breathability of the as-developed thin PET based films were tested according to the industrial standard ASTM E96 method B at the temperature of 23° C. and 50% relative humidity in the testing chamber. The breathability was represented by the Water Vapor Transmission Rate (WVTR) with the unit of $g/m^2/24$ hr.

In addition to in house breathability test, the thin film samples have also been sent to an external lab (SGS-CSTC Standards Technical Services Co., Ltd. Guangzhou Branch) for the breathability test according to ASTM E96 method B. The results were shown in Table 4.

TABLE 4

Breathability of non-porous PET based films with a thickness less than 40 μm

| | PET base resin (CR8816) | Modifier (VT3108) | Modifier (MH1657) | Compatibilizer (24MA02) | Thickness (μm) | In house WVTR ($g/m^2/24$ hr) | External lab WVTR ($g/m^2/24$ hr) |
|---|---|---|---|---|---|---|---|
| Control PET40 | 100% | — | — | — | 38 ± 1 (n = 3) | 11 ± 2 (n = 3) | 24.7 (n = 3) |
| NBF-PET40#1 | 80% | 20% | — | — | 34 ± 4 (n = 3) | 37 ± 12 (n = 3) | 30.4 (n = 3) |
| NBF-PET40#2 | 70% | 30% | — | — | 37 ± 3 (n = 3) | 44 ± 9 (n = 3) | 40.0 (n = 3) |
| NBF-PET40#3 | 60% | 40% | — | — | 38 ± 1 (n = 3) | 62 ± 15 (n = 3) | 75.1 (n = 3) |
| NBF-PET40#4 | 50% | — | 40% | 10% | 38 ± 2 (n = 3) | 820 ± 32 (n = 3) | 817 (n = 3) |

From Table 4, NBF-PET40 #4 has achieved the target breathability. It was also found that the modifier MH1657 can significantly enhance the breathability of the PET based NBF, from 11 $g/m^2/24$ hr to 820 $g/m^2/24$ hr.

Example 5

Cost

The material cost for thin PET based non-porous films has been evaluated to ensure it would not exceed 4.0 $HKD/m^2$. The density of PET and PET based films are about 1400 $kg/m^3$ and 1250 $kg/m^3$, respectively. The material cost is calculated by following equation:

$$\text{Material cost } (HKD/m^2) = \left[\sum \text{cost of component}(HKD/\text{kg}) * \text{percentage of component}\right] * \text{density}(\text{kg}/m^3) * (\text{target thickness}(m))$$

By using the equation above, the material cost for all thin PET based films was calculated and showed in Table 5.

TABLE 5

Material cost of thin PET based films

| | PET base resin (CR8816) | Unit price (HKD/kg) | Modifier (VT3108) | Unit price (HKD/kg) | Modifier (MH1657) | Unit price (HKD/kg) | Compatibilizer (24MA02) | Unit price (HKD/kg) | Material cost ($HKD/m^2$) |
|---|---|---|---|---|---|---|---|---|---|
| Control PET40 | 100% | 9.00 | — | — | — | — | — | — | 0.50 |
| NBF-PET40#1 | 80% | 9.00 | 20% | 55.00 | — | — | — | — | 0.91 |
| NBF-PET40#2 | 70% | 9.00 | 30% | 55.00 | — | — | — | — | 1.14 |

TABLE 5-continued

Material cost of thin PET based films

|  | PET base resin (CR8816) | Unit price (HKD/kg) | Modifier (VT3108) | Unit price (HKD/kg) | Modifier (MH1657) | Unit price (HKD/kg) | Compatibilizer (24MA02) | Unit price (HKD/kg) | Material cost (HKD/m²) |
|---|---|---|---|---|---|---|---|---|---|
| NBF-PET40#3 | 60% | 9.00 | 40% | 55.00 | — | — | — | — | 1.37 |
| NBF-PET40#4 | 50% | 9.00 | — | — | 40% | 110.00 | 10% | 30.00 | 2.58 |

Note:
The density of PET is 1400 kg/m³; non-porous film is 1250 kg/m³, thickness 40 μm for calculation Referring to Table 5, it was found that all the thin PET based films have met the target that the material cost did not exceed 4.00 HKD/m².

Example 6

Fabrication of Thick PET Based Non-Porous Film

PET CR8816 was chosen to be the base resin of PET, as it is transparent, mechanically strong, skin and food contact safe. Arnitel VT3108 or Pebax MH1675 were chosen for modifying PET. Since these two modifiers have excellent water vapor transportation properties, they were expected to improve the breathability of the films significantly. In addition, a compatibilizer was added.

Four thin PET based non-porous films were prepared by mixing the PET base resin and modifier, followed by film extrusion and hot press process. In particular, the mixing of PET resin and modifier was achieved by using a co-rotating twin-screw extruder (HAKKE, PTW16/25 OS), and the temperature was at 200 to 290° C. The screw speed was set at 300 rpm.

Figure 3:
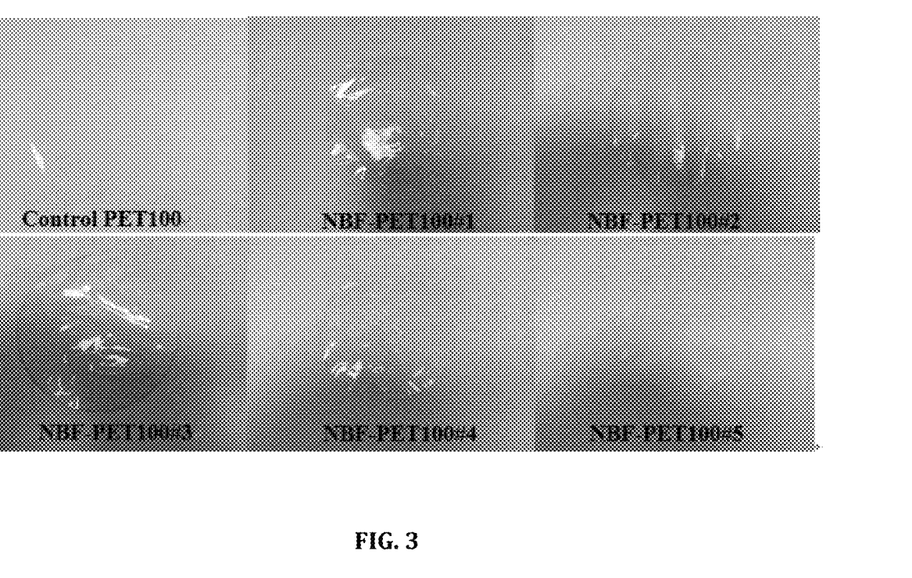
FIG. 3 depicts appearance of the prepared thick PET-based films with thickness more than 0.1 mm in accordance to one embodiment of the present invention.

Different film forming compositions in accordance with the present invention are shown in Table 6. The as-prepared thin PET based non-porous films were shown in FIG. 3. All formulations can form films with thicknesses less than 40 μm.

TABLE 6

Formulations of thick PET based non-porous films.

|  | PET base resin (CR8816) | Modifier (VT3108) | Modifier (MH1657) | Compatibilizer (20MA02) |
|---|---|---|---|---|
| NBF-PET100 #1 | 80% | 20% | — | — |
| NBF-PET100 #2 | 70% | 30% | — | — |

TABLE 6-continued

Formulations of thick PET based non-porous films.

|  | PET base resin (CR8816) | Modifier (VT3108) | Modifier (MH1657) | Compatibilizer (20MA02) |
|---|---|---|---|---|
| NBF-PET100 #3 | 60% | 40% | — | — |
| NBF-PET100 #4 | 50% | 50% | — | — |
| NBF-PET100 #5 | 50% | — | 40% | 10% |

Example 7

Analysis of Appearance of the Thick Film

To ensure the as-prepared thick films are non-porous, SEM imaging were conducted.

Figure 4:
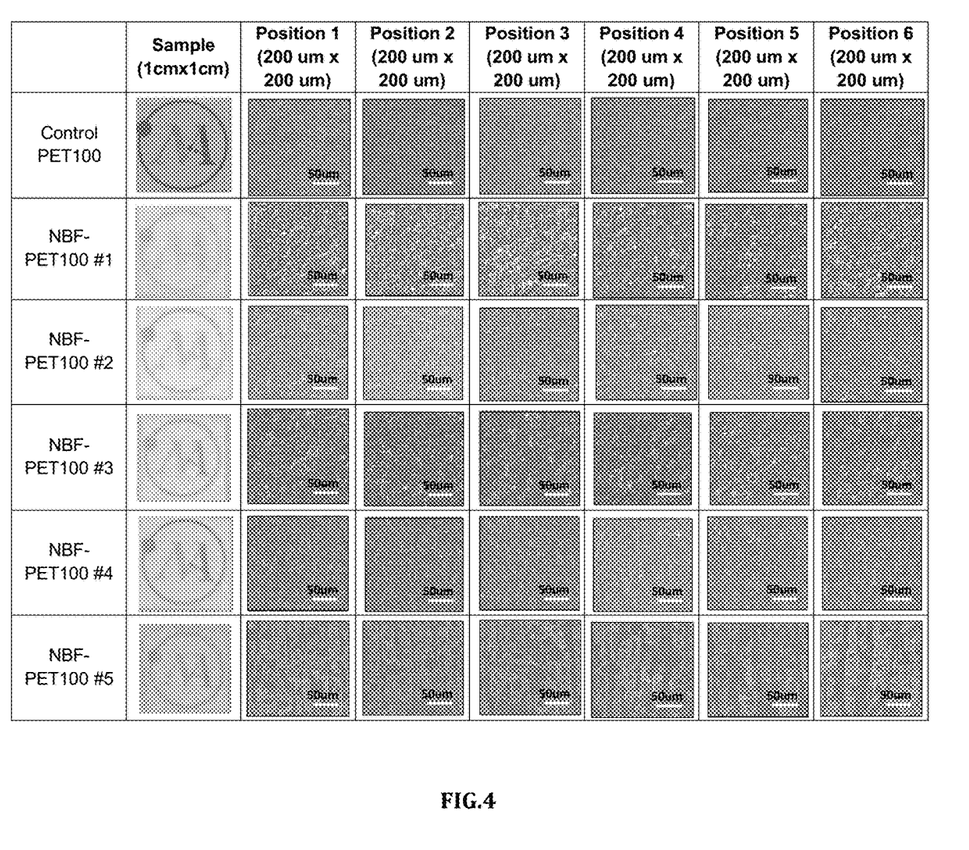
FIG. 4 depicts appearance of the prepared thick PET-based films with thickness more than 0.1 mm in accordance to one embodiment of the present invention.

Six different areas of the films (200 μm×200 μm for each) were selected and no obvious pore was founded. The SEM images of non-porous PET based films with a thickness more than 0.1 mm were shown in FIG. 4. From the SEM images, it could be seen that no pore with diameter larger than 1 μm was observed.

Example 8

Transmittance of the Thick Film

The light transmittance of the prepared thick films was measured in comparison with the unmodified control films (e.g. PET) according to industrial standard test methods (e.g. ASTM E 96 B).

The light transmittance of the as-prepared thick PET based films has been tested and compared with the control films to ensure the light transmittance of the films can retain no less than 90% of the control films. The results of non-porous PET based films were shown in Table 7.

TABLE 7

Light transmittance of non-porous PET based films with a thickness more than 0.1 mm

|  | PET base resin (CR8816) | Modifier (VT3108) | Modifier (MH1657) | Compatibilizer (24MA02) | Thickness (μm) | Light transmittance (%) | Light trans. Retention (%) |
|---|---|---|---|---|---|---|---|
| Control PET100 | 100% | — | — | — | 129 ± 13 (n = 3) | 88.89 ± 0.21 (n = 3) | N/A |
| NBF-PET100#1 | 80% | 20% | — | — | 126 ± 5 (n = 3) | 84.67 ± 1.59 (n = 3) | 95.26 |
| NBF-PET100#2 | 70% | 30% | — | — | 119 ± 11 (n = 3) | 81.88 ± 1.93 (n = 3) | 92.11 |
| NBF-PET100#3 | 60% | 40% | — | — | 123 ± 17 (n = 3) | 83.87 ± 4.19 (n = 3) | 94.35 |
| NBF-PET100#4 | 50% | 50% | — | — | 131 ± 22 (n = 3) | 84.89 ± 3.69 (n = 3) | 95.50 |

TABLE 7-continued

Light transmittance of non-porous PET based films with a thickness more than 0.1 mm

| | PET base resin (CR8816) | Modifier (VT3108) | Modifier (MH1657) | Compatibilizer (24MA02) | Thickness (μm) | Light transmittance (%) | Light trans. Retention (%) |
|---|---|---|---|---|---|---|---|
| NBF-PET100#4 | 50% | — | 40% | 10% | 103 ± 4 (n = 3) | 77.49 ± 2.23 (n = 3) | 91.16 |

From Table 7, it was found that the light transmittance retention for thick non-porous PET based films was more than 90% when comparing to the corresponding control films, which indicated the addition of the modifiers would not have big impact to the light transmittance of the films.

Example 9

Breathability of the Thick Film

Apart from the retention of light transmittance, the breathability of the as-developed thick PET based films were tested according to the industrial standard ASTM E96 method B at the temperature of 23° C. and 50% relative humidity in the testing chamber. The breathability was represented by the Water Vapor Transmission Rate (WVTR) with the unit of $g/m^2/hr$.

In addition to in house breathability test, the thick film samples have also been sent to an external lab (SGS-CSTC Standards Technical Services Co., Ltd. Guangzhou Branch) for the breathability test according to ASTM E96 method B. The results were shown in Table 8.

TABLE 8

Breathability of non-porous PET based films with a thickness more than 0.1 mm

| | PET base resin (CR8816) | Modifier (VT3108) | Modifier (MH1657) | Compatibilizer (24MA02) | Thickness (μm) | In house WVTR (g/m²/24 hr) | External lab WVTR (g/m²/24 hr) |
|---|---|---|---|---|---|---|---|
| Control PET100 | 100% | — | — | — | 129 ± 13 (n = 3) | 8 ± 2 (n = 3) | 9 (n = 3) |
| NBF-PET100#1 | 80% | 20% | — | — | 126 ± 5 (n = 3) | 10 ± 1 (n = 3) | N/A |
| NBF-PET100#2 | 70% | 30% | — | — | 119 ± 11 (n = 3) | 13 ± 1 (n = 3) | N/A |
| NBF-PET100#3 | 60% | 40% | — | — | 123 ± 17 (n = 3) | 23 ± 4 (n = 3) | N/A |
| NBF-PET100#4 | 50% | 50% | — | — | 131 ± 22 (n = 3) | 256 ± 27 (n = 3) | N/A |
| NBF-PET100#5 | 50% | — | 40% | 10% | 123 ± 5 (n = 3) | 624 ± 20 (n = 3) | 541 (n = 3) |

From Table 8, it was found that the breathability of NBF-PET100 #4 can achieve more than 250 g/m²/24 hr for in house breathability test, and NBF-PET100 #5 can achieve more than 300 g/m²/24 hr for both in house and external tests.

Example 10

Cost

The material cost for thick PET based non-porous films has been evaluated to ensure it would not exceed 10.0 HKD/m². The density of PET and PET based films are about 1400 kg/m³ and 1250 kg/m³, respectively. The material cost is calculated by following equation:

Material cost $(HKD/m^2)=$ $$[\sum \text{cost of component}(HKD/kg)*\text{percentage of component}]*\text{density}(kg/m^3)*(\text{target thickness}(m))$$

By using the equation above, the material cost for all thick PET based films was calculated and showed in Table 9.

TABLE 9

Material cost of thick PET based films

| | PET base resin (CR8816) | Unit price (HKD/kg) | Modifier (VT3108) | Unit price (HKD/kg) | Modifier (MH1657) | Unit price (HKD/kg) | Compatibilizer (24MA02) | Unit price (HKD/kg) | Material cost (HKD/m²) |
|---|---|---|---|---|---|---|---|---|---|
| Control PET100 | 100% | 9.00 | — | — | — | — | — | — | 1.26 |
| NBF-PET100#1 | 80% | 9.00 | 20% | — | — | — | — | — | 2.28 |
| NBF-PET100#2 | 70% | 9.00 | 30% | — | — | — | — | — | 2.85 |
| NBF-PET100#3 | 60% | 9.00 | 40% | — | — | — | — | — | 3.43 |
| NBF-PET100#4 | 50% | 9.00 | 50% | — | — | — | — | — | 4.00 |
| NBF-PET100#5 | 50% | 9.00 | — | — | 40% | 110.00 | 10% | 30.00 | 6.44 |

Note:
The density of PET is 1400 kg/m³; non-porous film is 1250 kg/m³, thickness 100 μm for calculation Referring to Table 9, it was found that all the thin PET based films have met the target that the material cost did not exceed 10.00 HKD/m².

It will be appreciated by those skilled in the art, in view of these teachings, that alternative embodiments may be implemented without deviating from the spirit or scope of the invention, as set forth in the appended claims. This invention is to be limited only by the following claims, which include all such embodiments and modifications when viewed in conjunction with the above specification and accompanying drawings.

INDUSTRIAL APPLICABILITY

The present invention relates to non-porous, breathable and waterproof transparent plastic films of different thicknesses made by using 3-step processes, including twin screw extrusion (TSE) process, single screw extrusion (SSE) process, and flat vulcanizing process. The resultant films are tunable and stable breathability, high transparency, and low cost. They are also resistant to liquid penetration and microcontaminants such as bacteria and virus, making them suitable for broad applications in medical, healthcare and food packaging industries.

The invention claimed is:

1. A non-porous, breathable and waterproof transparent plastic film on a plastic substrate, comprising:
   a thermoplastic polyester base resin;
   an amphiphilic modifier having a hydrophilic segment that acts as a channel for water vapor transmission through the film connected to a hydrophobic segment that anchors the amphiphilic modifier to a portion of the thermoplastic polyester base resin; and
   a compatibilizer, and
   wherein the breathable and waterproof transparent film has a water vapor transmission rate (WVTR) or breathability of not less than 250 g/m²/24 hr according to ASTM E96B, and wherein the film has at least 90% of the transmittance.

2. The non-porous, breathable and waterproof transparent plastic film according to claim 1, wherein the thermoplastic polyester resin comprises PET, PBT, PTT, PC, or PLA.

3. The non-porous, breathable and waterproof transparent plastic film according to claim 2, wherein the content of the thermoplastic polyester resin ranges from 50 to 80 weight percent, the content of the amphiphilic modifier ranges from 20 to 40 weight percent, and the content of the compatibilizer ranges from 5 to 10 weight percent.

4. The non-porous, breathable and waterproof transparent plastic film according to claim 1, wherein the amphiphilic modifier comprises at least one hydrophobic hard segment with the repeating unit of 1 to 1000 and at least one hydrophilic soft segment with the repeating unit of 1 to 1000.

5. The non-porous, breathable and waterproof transparent plastic film according to claim 1, wherein the at least one hydrophilic soft segment comprises polyether, and the at least one hydrophobic hard segment comprises polyester.

6. The non-porous, breathable and waterproof transparent plastic film according to claim 5, wherein the polyether comprises polyethylene glycol (PEG), polypropylene glycol (PPG), polyethylene oxide (PEO), or a combination thereof.

7. The non-porous, breathable and waterproof transparent plastic film according to claim 1, wherein the compatibilizer comprises a random copolymer of ethylene and methyl acrylate.

8. The non-porous, breathable and waterproof transparent plastic film according to claim 1, further comprising a chain extender incorporated between the base polymer and the amphiphilic modifier to form a coupling bridge, wherein the chain extender comprises at least one polyol.

9. The non-porous, breathable and waterproof transparent plastic film according to claim 1, wherein thickness of the non-porous, breathable and waterproof transparent plastic film is in a range of 1 to 40 μm or more than 0.1 mm.

10. A method for preparing a non-porous, breathable and waterproof transparent plastic film of claim 1, wherein the method comprises:
mixing a thermoplastic polyester resin with an amphiphilic modifier and a compatibilizer via an extruder to obtain a polymer mixture;
dividing the polymer mixture into small pellets via a pelletizer;
extruding the small pellets via an extruder to obtain a film; and
hot pressing the film via a flat vulcanizing machine to form the non-porous, breathable and waterproof transparent plastic film.

11. The method according to claim 10, wherein the thermoplastic polyester resin comprises PET, PBT, PTT, PC, or PLA.

12. The method according to claim 10, wherein the content of the thermoplastic polyester resin ranges from 50 to 80 weight percent, the content of the amphiphilic modifier ranges from 20 to 40 weight percent, and the content of the compatibilizer ranges from 5 to 10 weight percent.

13. The method according to claim 10, wherein the amphiphilic modifier comprises at least one hydrophobic hard segment with the repeating unit of 1 to 1000 and at least one hydrophilic soft segment with the repeating unit of 1 to 1000.

14. The method according to claim 13, wherein the at least one hydrophilic soft segment comprises polyether, and the at least one hydrophobic hard segment comprises polyester.

15. The method according to claim 14, wherein the polyether comprises polyethylene glycol (PEG), polypropylene glycol (PPG), polyethylene oxide (PEO), or a combination thereof.

16. The method according to claim 10, wherein the compatibilizer comprises a random copolymer of ethylene and methyl acrylate.

17. The method according to claim 10, further comprising a chain extender including at least one polyol.

18. The method according to claim 10, wherein the thickness of the non-porous, breathable and waterproof transparent plastic film is in a range of 1 to 40 μm or more than 0.1 mm.

* * * * *